(12) United States Patent
Gopalan

(10) Patent No.: US 9,319,113 B2
(45) Date of Patent: Apr. 19, 2016

(54) SIMPLIFIED MULTIPLE INPUT MULTIPLE OUTPUT (MIMO) COMMUNICATION SCHEMES FOR INTERCHIP AND INTRACHIP COMMUNICATIONS

(71) Applicant: QUALCOMM Incorporated, San Diego, CA (US)

(72) Inventor: RaviKiran Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/491,027

(22) Filed: Sep. 19, 2014

(65) Prior Publication Data

US 2016/0087697 A1   Mar. 24, 2016

(51) Int. Cl.
*H04L 1/02* (2006.01)
*H04L 27/00* (2006.01)
*H04B 7/08* (2006.01)
*H04B 7/04* (2006.01)

(52) U.S. Cl.
CPC ............... *H04B 7/0413* (2013.01); *H04B 7/08* (2013.01)

(58) Field of Classification Search
CPC ................. H04L 25/0242; H04L 2025/03426; H04L 5/0023; H04B 7/0697
See application file for complete search history.

(56) References Cited

U.S. PATENT DOCUMENTS 7,260,153 B2   8/2007   Nissani (Nissensohn)
7,420,916 B2 *   9/2008   Zhang ................ H04L 25/0204 370/210
7,483,480 B2   1/2009   Guo et al.

(Continued)

FOREIGN PATENT DOCUMENTS

CN   103378888 A   10/2013
EP   2061160 A1   5/2009
EP   2481163 A1   8/2012

OTHER PUBLICATIONS

Bichan, Mike, "Crosstalk-Aware Transmitter Pulse-Shaping for Parallel Chip-to-Chip Links," Thesis for Master of Applied Science, Graduate Department of Electrical and Computer Engineering, University of Toronto, 2006, 83 pages.

(Continued)

*Primary Examiner* — Tesfaldet Bocure
(74) *Attorney, Agent, or Firm* — Withrow & Terranova, PLLC

(57) ABSTRACT

Aspects disclosed in the detailed description include simplified multiple input multiple output (MIMO) communication schemes for interchip and intrachip communications. In exemplary aspects, MIMO techniques are applied to interchip and intrachip communication systems. In particular, a programmable control function is provided at an electrical signal source and supports a default MIMO communication scheme on a MIMO channel comprising possible communication paths among a plurality of transmitting and receiving endpoints. In addition, the programmable control function can opportunistically employ a simplified MIMO communication scheme when the MIMO channel is determined to be a tri-diagonal MIMO channel. The simplified MIMO communication scheme uses an Inverse Fast Fourier Transformation (IFFT) with reduced computational complexity. By employing the simplified MIMO communication scheme, interchip or intrachip communication may be supported with reduced implementation complexity, lower power consumption, and improved robustness.

25 Claims, 6 Drawing Sheets

$$H_1 = \begin{bmatrix} h_{1,1} & h_{1,2} & 0 & 0 & \cdots & 0 & 0 \\ h_{2,1} & h_{2,2} & h_{2,3} & 0 & \cdots & 0 & 0 \\ 0 & h_{3,2} & h_{3,3} & h_{3,4} & \cdots & 0 & 0 \\ \vdots & \vdots & \vdots & \ddots & \vdots & \vdots & \vdots \\ 0 & 0 & 0 & \cdots & h_{N-2,N-2} & h_{N-2,N-1} & 0 \\ 0 & 0 & 0 & \cdots & h_{N-1,N-2} & h_{N-1,N-1} & h_{N-1,N} \\ 0 & 0 & 0 & \cdots & 0 & h_{N,N-1} & h_{N,N} \end{bmatrix}_{N \times N}$$

(56) References Cited

U.S. PATENT DOCUMENTS

| | | |
|---|---|---|
| 7,680,461 B2 | 3/2010 | Takano |
| 7,773,685 B2 | 8/2010 | Tirkkonen et al. |
| 8,107,983 B2 | 1/2012 | Zangi et al. |
| 8,233,556 B2 | 7/2012 | Waters et al. |
| 8,249,186 B2 | 8/2012 | Koo et al. |
| 8,345,789 B2 | 1/2013 | Ruscitto et al. |
| 8,384,596 B2 | 2/2013 | Rofougaran et al. |
| 8,401,598 B2 | 3/2013 | Rofougaran et al. |
| 8,456,374 B1 | 6/2013 | Bagley et al. |
| 8,467,467 B2 | 6/2013 | Lee et al. |
| 8,472,543 B2 | 6/2013 | Ariyavisitakul et al. |
| 8,483,310 B2 | 7/2013 | Coldrey et al. |
| 8,553,521 B2 | 10/2013 | Zhang et al. |
| 8,750,788 B2 | 6/2014 | Kim et al. |
| 8,767,657 B1 | 7/2014 | Dehghan et al. |
| 8,831,118 B2 | 9/2014 | Takano |
| 2004/0171359 A1 | 9/2004 | Tirkkonen et al. |
| 2004/0228392 A1* | 11/2004 | Zhang .............. H04L 25/0204 375/148 |
| 2005/0075080 A1 | 4/2005 | Zhang |
| 2006/0172719 A1 | 8/2006 | Chen et al. |
| 2006/0285606 A1 | 12/2006 | Khojastepour et al. |
| 2009/0225889 A1* | 9/2009 | Tsai .................. H04L 1/0065 375/267 |
| 2009/0268834 A1 | 10/2009 | Ariyavisitakul et al. |
| 2011/0182336 A1 | 7/2011 | Chin et al. |
| 2011/0183630 A1 | 7/2011 | Rofougaran et al. |
| 2011/0268225 A1 | 11/2011 | Cronie et al. |
| 2012/0008663 A1* | 1/2012 | Schilling ............. H04B 1/707 375/146 |
| 2012/0063531 A1 | 3/2012 | Ginis et al. |
| 2012/0287974 A1 | 11/2012 | Muralidhar et al. |
| 2013/0243046 A1 | 9/2013 | Vetterli et al. |
| 2014/0071851 A1 | 3/2014 | Plainchault et al. |
| 2015/0146646 A1 | 5/2015 | Chen et al. |
| 2015/0236769 A1 | 8/2015 | Alexiou et al. |

OTHER PUBLICATIONS

Milosevic, Pavle et al., "Design of a 12Gb/s Transceiver for High-Density Links with Discontinuities using Modal Signaling," IEEE 20th Conference on Electrical Performance of Electronic Packaging and Systems (EPEPS), Oct. 23-26, 2011, San Jose, California, IEEE, pp. 215-218.

Palermo, Samuel, "Chapter 9: High-Speed Serial I/O Design for Channel-Limited and Power-Constrained Systems," CMOS Nanoelectronics: Analog and RF VLSI Circuits, Jun. 27, 2011, McGraw-Hill, 51 pages.

Sham, Kin-Joe, "Crosstalk Mitigation Techniques in High-Speed Serial Links," Thesis for Doctor of Philosophy, University of Minnesota, Apr. 2009, 144 pages.

Gopalan, Ravikiran, et al., "Multiple Input Multiple Output (MIMO) Communication Systems and Methods for Chip to Chip and Intrachip Communication", U.S. Appl. No. 62/032,027, filed Aug. 1, 2014, 19 pages.

Whatmough, Paul N. et al., "VLSI Architecture for a Reconfigurable Spectrally Efficient FDM Baseband Transmitter," IEEE Transactions on Circuits and Systems I: Regular Papers, IEEE, vol. 59, No. 1, May 1, 2012, pp. 1107-1118.

International Search Report and Written Opinion for PCT/US2015/045006, mailed Oct. 12, 2015, 12 pages.

Hunger, R., "Analysis and Transceiver Design for the MIMO Broadcast Channel," Foundations in Signal Processing, Communications and Networking, vol. 8, Springer, 2013, pp. 13-16.

* cited by examiner

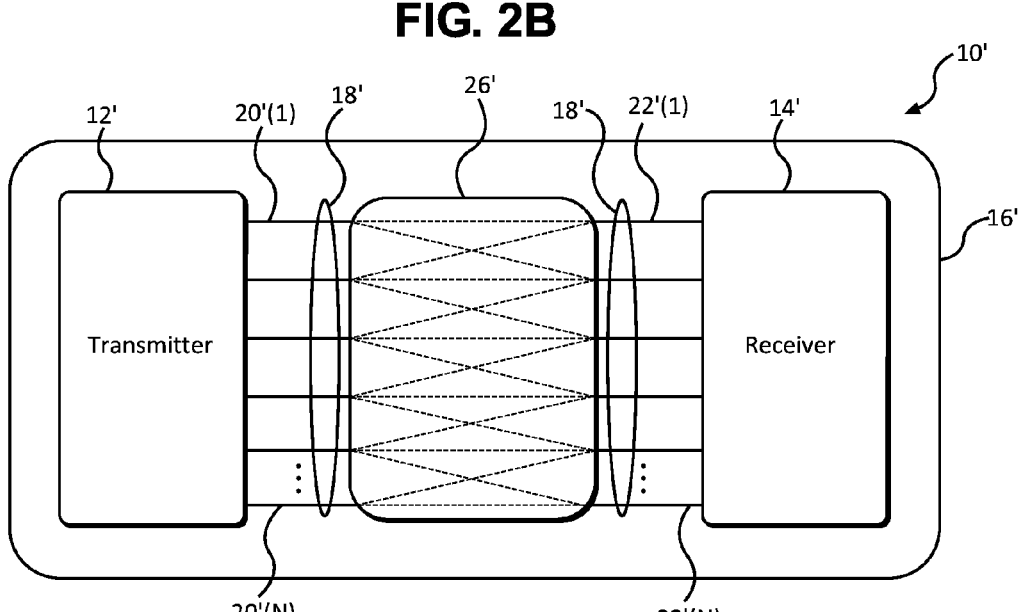

SIMPLIFIED MULTIPLE INPUT MULTIPLE OUTPUT (MIMO) COMMUNICATION SCHEMES FOR INTERCHIP AND INTRACHIP COMMUNICATIONS

BACKGROUND

I. Field of the Disclosure

The technology of the disclosure relates generally to communication techniques between chips or between dies within a package.

II. Background

Computing devices have become common in modern society. The prevalence of computing devices may be attributed to the many functions that are enabled within such computing devices. Increasingly complex integrated circuits have been designed and manufactured to provide increasingly greater functionality. Concurrent with the increases in complexity of the integrated circuits, there has been pressure to decrease the area consumed by the integrated circuits.

In many instances, the computing devices include a motherboard with several integrated circuits communicatively coupled to one another through conductive elements referred to as buses. Signals are passed from one integrated circuit to a second integrated circuit over such buses. As the complexity of the integrated circuits increases, the number of conductive elements required to convey signals between the integrated circuits typically increases. Likewise, as the amount of data increases, the frequencies at which the data is transmitted increase. As the number of conductive elements increases and the frequencies also increase, the opportunities for signals to interfere with one another increase. This interference is commonly referred to as electromagnetic interference (EMI) or crosstalk. If the EMI is too severe, undesirable errors may be introduced into the signal stream. While of concern for communication between two integrated circuits, EMI concerns also exist for communication that takes place between two dies within a single integrated circuit package.

Historically, each conductive element was treated as being functionally independent of other conductive elements even when the conductive elements were proximate one another, such that crosstalk could occur. Because activity on one conductive element frequently impacts other conductive elements, designers appreciate the ability to model the conductive elements more effectively so as to create more efficient communication schemes for communication between integrated circuits or between dies of a single integrated circuit package.

SUMMARY OF THE DISCLOSURE

Aspects disclosed in the detailed description include simplified multiple input multiple output (MIMO) communication schemes for interchip and intrachip communications. In exemplary aspects, MIMO techniques are applied to interchip and intrachip communication systems. In particular, a programmable control function is provided at an electrical signal source and supports a default MIMO communication scheme on a MIMO channel comprising possible communication paths among a plurality of transmitting and receiving endpoints. In addition, the programmable control function can opportunistically employ a simplified MIMO communication scheme when the MIMO channel is determined to be a tri-diagonal MIMO channel. The simplified MIMO communication scheme uses Inverse Fast Fourier Transformation (IFFT) with reduced computational complexity. By employing the simplified MIMO communication scheme, interchip or intrachip communication may be supported with reduced implementation complexity, lower power consumption, and improved robustness.

In this regard in one aspect, an electrical signal source is provided. The electrical signal source comprises a plurality of communication endpoints that are configured to transmit communication signals over a MIMO channel. The electrical signal source also comprises a programmable control function communicatively coupled to the plurality of communication endpoints. The programmable control function is configured to receive a plurality of MIMO communication signals associated with a first column vector. The programmable control function is further configured to determine if the MIMO channel is a tri-diagonal MIMO channel. The programmable control function is further configured to generate a second column vector that comprises the first column vector and a plurality of add-on signal elements. The programmable control function is further configured to provide the second column vector to an IFFT function to generate a plurality of transformed signals. The programmable control function is further configured to cause a subset of the plurality of transformed signals to be transmitted over the plurality of communication endpoints.

In another aspect, an electrical signal source means is provided. The electrical signal source means comprises a means for communication signal transmission over a MIMO channel having a tri-diagonal channel response matrix. The electrical signal source means also comprises a means for programmable control communicatively coupled to a plurality of communication endpoints. The means for programmable control is configured to receive a plurality of MIMO communication signals associated with a first column vector. The means for programmable control is also configured to generate a second column vector that comprises the first column vector and a plurality of add-on signal elements. The means for programmable control is also configured to provide the second column vector to an IFFT function to generate a plurality of transformed signals. The means for programmable control is also configured to cause a subset of the plurality of transformed signals to be transmitted over the plurality of communication endpoints.

In another aspect, a method for transmitting communication signals over a MIMO channel having a tri-diagonal channel response matrix is provided. The method comprises receiving a plurality of MIMO communication signals associated with a first column vector $\{d_1, d_2, \ldots d_N\}$. The method also comprises generating a second column vector $\{d_0, d_1, d_2, \ldots d_N, d_{N+1}, d_{N+2}, \ldots d_{2(N+1)-1}\}$ that comprises the first column vector $\{d_1, d_2, \ldots d_N\}$ and a plurality of add-on signal elements. The method also comprises providing the second column vector to an IFFT function to generate a plurality of transformed signals associated with a third column vector $\{D_0, D_1, D_2, \ldots D_N, D_{N+1}, D_{N+2}, \ldots D_{2(N+1)-1}\}$. The method also comprises providing a subset of the plurality of transformed signals $\{D_1, D_2, \ldots D_N\}$ from the third column vector to a plurality of communication endpoints for transmission.

In another aspect, a MIMO communication system for interchip and intrachip communication is provided. The MIMO communication system comprises an electrical signal source. The electrical signal source also comprises a programmable control function communicatively coupled to a first communication interface and a second communication interface. The electrical signal source also comprises a simplified MIMO function communicatively coupled to the second communication interface and a third communication interface, wherein the simplified MIMO function comprises an IFFT function. The electrical signal source also comprises a plurality of communication endpoints communicatively coupled to the third communication interface. The MIMO communication system also comprises an electrical signal receiver. The electrical signal receiver comprises a plurality of receiver communication endpoints communicatively coupled to a signal input interface. The electrical signal receiver also comprises a computational function communicatively coupled to the signal input interface and a signal output interface. The electrical signal receiver further comprises a receiver programmable control function communicatively coupled to the signal output interface. The MIMO communication system also comprises a MIMO channel coupled with the plurality of communication endpoints and the plurality of receiver communication endpoints, wherein the MIMO channel is a tri-diagonal MIMO channel.

BRIEF DESCRIPTION OF THE FIGURES

FIG. 2B is a block diagram of an exemplary channel matrix of the MIMO channel model of FIG. 2A;

FIG. 3A is a block diagram of an exemplary MIMO tri-diagonal channel model of a communication system;

FIG. 3B is a block diagram of an exemplary tri-diagonal channel matrix of the MIMO tri-diagonal channel model of FIG. 3A;

DETAILED DESCRIPTION

Figure 1:
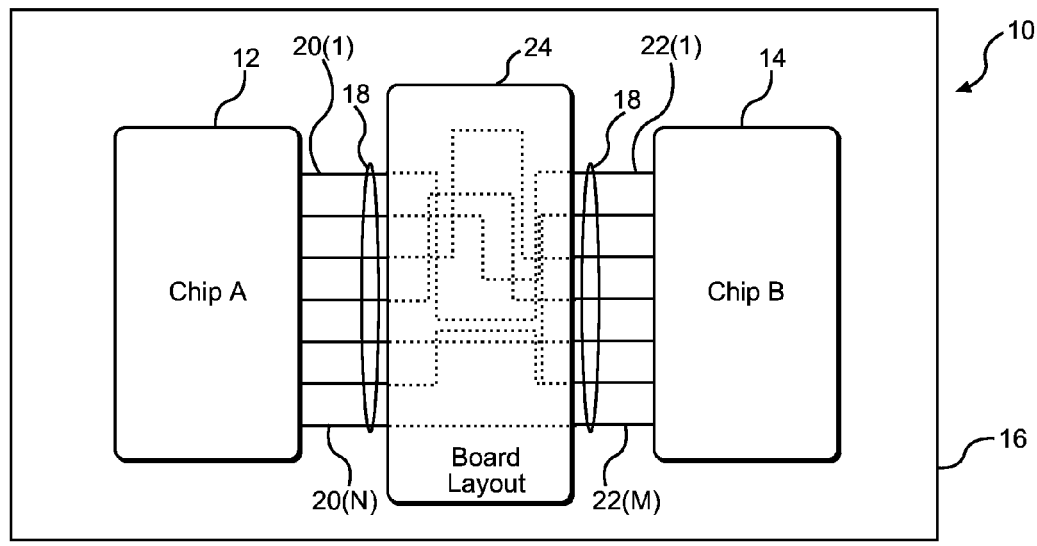
FIG. 1 is a block diagram of an exemplary interchip communication system that may benefit from exemplary aspects of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include simplified multiple input multiple output (MIMO) communication schemes for interchip and intrachip communications. In exemplary aspects, MIMO techniques are applied to interchip and intrachip communication systems. In particular, a programmable control function is provided at an electrical signal source and supports a default MIMO communication scheme on a MIMO channel comprising possible communication paths among a plurality of transmitting and receiving endpoints. In addition, the programmable control function can opportunistically employ a simplified MIMO communication scheme when the MIMO channel is determined to be a tri-diagonal MIMO channel. The simplified MIMO communication scheme uses Inverse Fast Fourier Transformation (IFFT) with reduced computational complexity. By employing the simplified MIMO communication scheme, interchip or intrachip communication may be supported with reduced implementation complexity, lower power consumption, and improved robustness.

Before discussing aspects of a MIMO-based electrical signal source that includes specific aspects of the present disclosure, a brief overview of MIMO-based interchip communication systems that may incorporate exemplary aspects of the present disclosure is provided with reference to FIGS. 1-3B. The discussion of specific exemplary aspects of a MIMO-based electrical signal source that comprises a programmable control function begins with reference to FIG. 4.

In this regard, FIG. 1 is block diagram of an exemplary interchip communication system 10 that may benefit from exemplary aspects of the present disclosure. The interchip communication system 10 may include a first integrated circuit (IC) or chip 12 ("Chip A") and a second IC or chip 14 ("Chip B"). The chips 12, 14 may be positioned on a printed circuit board (PCB) 16, such as through soldering or the like. The chips 12, 14 are communicatively coupled by conductive elements 18 (sometimes referred to as channels). The first chip 12 is coupled to the conductive elements 18 by a plurality of endpoints 20(1)-20(N). Similarly, the second chip 14 is coupled to the conductive elements 18 by a plurality of endpoints 22(1)-22(M). The notations "1–N" and "1–M" indicate that any number of the referenced endpoints, 1–N and 1–M, respectively, may be provided. It should be appreciated that the conductive elements 18 may be routed between the first chip 12 and the second chip 14 by routing software so as to minimize the distance traveled, while also providing space for other elements (e.g., other chips, inductors, capacitors, or the like) on the PCB 16. The routing of the conductive elements 18 is generally noted as a board layout 24. By treating the plurality of endpoints 20(1)-20(N) and the plurality of endpoints 22(1)-22(M) as MIMO transmit and receive antennas, respectively, the interchip communication system 10 may be supported as a MIMO communication system.

Figure 2A:
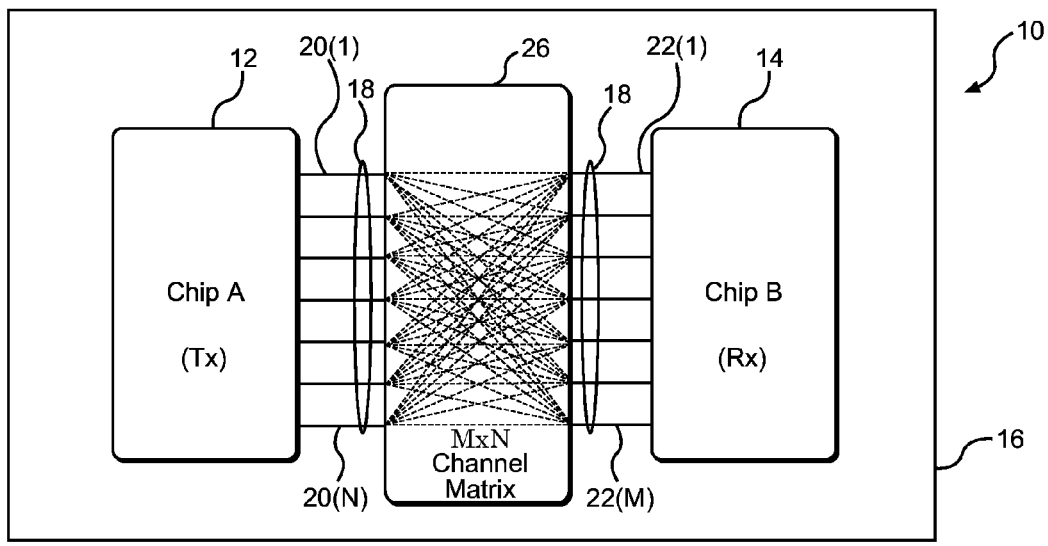
FIG. 2A is a block diagram of an exemplary multiple input multiple output (MIMO) channel model of the interchip communication system of FIG. 1.

In this regard, FIG. 2A illustrates an exemplary MIMO channel model of the interchip communication system 10 of FIG. 1. In FIG. 2A, the first chip 12 is a transmitter (Tx), and the second chip 14 is a receiver (Rx). Further, each of the plurality of endpoints 20(1)-20(N) is communicatively coupled to each of the plurality of endpoints 22(1)-22(M) to varying degrees by virtue of electromagnetic interference (EMI) and crosstalk between the conductive elements 18. For example, endpoint 20(1) may be communicatively coupled to endpoints 22(1), 22(2), . . . 22(M), respectively. Likewise, endpoint 20(N) may also be communicatively coupled to endpoints 22(1), 22(2), . . . 22(M), respectively. Thus, the coupling among the plurality of endpoints 20(1)-20(N) and the plurality of endpoints 22(1)-22(M) may be represented as an M×N channel matrix 26.

In this regard, FIG. 2B is a block diagram of an exemplary channel matrix 28 of the MIMO channel model of FIG. 2A. Elements of FIG. 2A are referenced in connection with FIG. 2B and will not be re-described herein. According to FIG. 2B, the channel matrix 28 has M rows and N columns, wherein M and N are finite integer numbers. In this regard, the channel matrix 28 is referred to as an M×N channel matrix. Each of the M rows corresponds to one of the plurality of endpoints 22(1)-22(M). Each of the N columns corresponds to one of the plurality of endpoints 20(1)-20(N). Accordingly, each of the elements in the channel matrix 28 represents a communication signal transmitted between one of the plurality of endpoints 20(1)-20(N) in the first chip 12 and one of the plurality of endpoints 22(1)-22(M) in the second chip 14. For example, an element $h_{i,j}$ ($0 \leq i \leq M$, $0 \leq j \leq N$) in the channel matrix 28 represents a communication signal transmitted from endpoint 20(j) in the first chip 12 to endpoint 22(i) in the second chip 14.

With reference back to FIG. 2A, by treating the channels of the conductive elements 18 as interdependent instead of independent, MIMO solutions may be applied to the chip to chip interchip communication system 10 so as to form vectorized signaling using eigenvector beamforming at the first chip 12 and combining at the second chip 14 within the interchip communication system 10. Such MIMO solutions help eliminate or at least mitigate the effects caused by crosstalk, reflections, limited bandwidth, and jitter. In exemplary aspects of the present disclosure, orthogonal frequency division multiplexing (OFDM) may be used with the MIMO solutions so as to allow for frequency selective channels.

While the MIMO channel model of FIG. 2A and the channel matrix 28 of FIG. 2B support all possible communication paths among the plurality of endpoints 20(1)-20(N) and the plurality of endpoints 22(1)-22(M), not all of the possible communication paths are needed or utilized at all times. The MIMO channel model and the channel matrix 28 can be simplified when a subset of the communication paths is utilized. In this regard, FIG. 3A illustrates an exemplary MIMO tri-diagonal channel model of a communication system 10'. The communication system 10' comprises a transmitter 12' and a receiver 14'. In a non-limiting example, the transmitter 12' is a first chip and the receiver 14' is a second chip when the communication system 10' is provided for interchip communication. In another non-limiting example, the transmitter 12' is a first die and the receiver 14' is a second die when the communication system 10' is provided for intrachip communication. The transmitter 12' comprises a plurality of endpoints 20'(1)-20'(N). In a non-limiting example, the transmitter 12' may be configured to provide a means for communication signal transmission. The receiver 14' comprises a plurality of endpoints 22'(1)-22'(N). In a non-limiting example, the transmitter 12' and the receiver 14' have an equal number of N endpoints. Unlike in FIG. 2A, each of the plurality of endpoints 20'(1)-20'(N) only communicates to adjacent endpoints from among the plurality of endpoints 22'(1)-22'(N). Similarly, each of the plurality of endpoints 22' (1)-22' (N) only communicates to adjacent endpoints from among the plurality of endpoints 20'(1)-20'(N). For example, endpoint 20'(1) in the transmitter 12' only communicates to endpoints 22'(1) and 22'(2) in the receiver 14'. Endpoint 20'(2) only communicates to endpoints 22'(1), 22'(2), and 22'(3). Likewise, endpoint 22'(1) in the receiver 14' only communicates to endpoints 20'(1) and 20'(2) in the transmitter 12'. Endpoint 22'(2) only communicates to endpoints 20'(1), 20'(2), and 20'(3). A MIMO tri-diagonal channel model 26' in the communication system 10' can be represented by a N×N tri-diagonal channel matrix, as discussed in more detail below.

In this regard, FIG. 3B is a block diagram of an exemplary tri-diagonal channel matrix 28' of the MIMO tri-diagonal channel model 26' in FIG. 3A. Elements of FIG. 3A are referenced in connection to FIG. 3B and will not be re-described herein. According to FIG. 3B, a N row by N column (N×N) tri-diagonal channel matrix 28' (represented by $H_1$) has non-zero elements only on the main diagonal (e.g., the diagonal from element $h_{1,1}$ to element $h_{N,N}$) and the two adjacent diagonals (e.g., the diagonals above and below the main diagonal). All other elements in the N×N tri-diagonal channel matrix 28' are zeroes. The tri-diagonal channel matrix 28' of FIG. 3B has special properties allowing a simplified MIMO communication scheme to be applied for interchip and intrachip communication.

Figure 4:
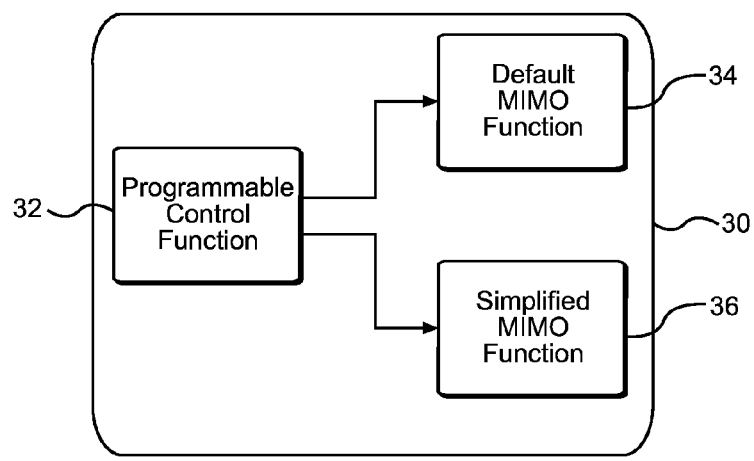
FIG. 4 is a block diagram of an exemplary MIMO-based electrical signal source with a programmable control function configured to select a default MIMO communication scheme or a simplified MIMO communication scheme.

In this regard, FIG. 4 is a block diagram of an exemplary MIMO-based electrical signal source 30 with a programmable control function 32 configured to select a default MIMO communication scheme or a simplified MIMO communication scheme. The electrical signal source 30, which may be the first chip 12 in FIG. 2A and/or the transmitter 12' in FIG. 3A in a non-limiting example, comprises the programmable control function 32. The programmable control function 32, according to a non-limiting example, may be implemented as a software-based function, or a hardware-based element, or a combination of both. The programmable control function 32, according to another non-limiting example, is configured to provide a means for programmable control. The electrical signal source 30 further comprises a default MIMO function 34 and a simplified MIMO function 36. The default MIMO function 34 is configured to support the MIMO channel model of FIG. 2A and the channel matrix 28 of FIG. 2B. In a non-limiting example, the default MIMO function 34 is configured to support the MIMO communication scheme as described in U.S. patent application Ser. No. 14/490,818, entitled "Multiple Input Multiple Output (MIMO) Communication Systems and Methods for Chip to Chip and Intrachip Communication," filed Sep. 19, 2014, and in U.S. Provisional Patent Application Ser. No. 62/032,027, entitled "Multiple Input Multiple Output (MIMO) Communication Systems and Methods for Chip to Chip and Intrachip Communication," filed Aug. 1, 2014, which are herein incorporated by reference in their entireties. The simplified MIMO function 36 is configured to support the MIMO tri-diagonal channel model of FIG. 3A and the tri-diagonal channel matrix 28' of FIG. 3B. In a non-limiting example, the simplified MIMO function 36 implements a simplified MIMO communication scheme. More detail regarding the simplified MIMO function 36 and the simplified MIMO communication scheme is provided with reference to FIGS. 6 and 7. The programmable control function 32 is configured to toggle between the default MIMO function 34 and the simplified MIMO function 36 according to a MIMO operation control process discussed next.

Figure 5:
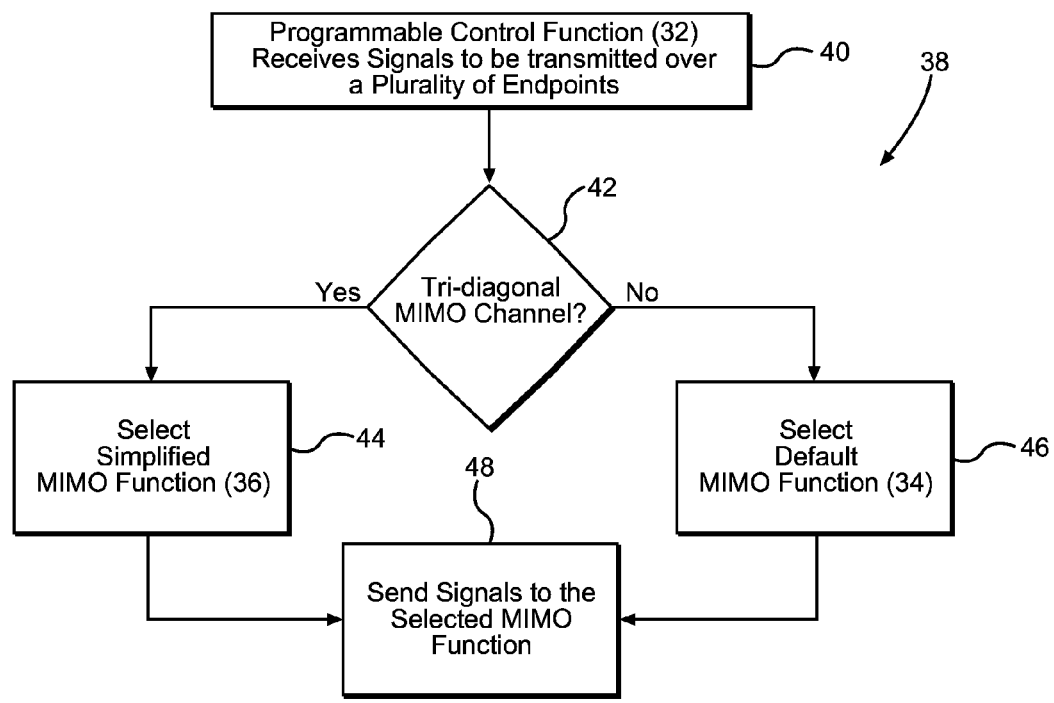
FIG. 5 is a flowchart of an exemplary MIMO operation control process used by the programmable control function of FIG. 4 to choose between a default MIMO communication scheme and a simplified MIMO communication scheme.

In this regard, FIG. 5 is a flowchart of an exemplary MIMO operation control process 38 used by the programmable control function 32 of FIG. 4 to choose between a default MIMO communication scheme and a simplified MIMO communication scheme. Elements of FIG. 4 are referenced in connection to FIG. 5 and will not be re-described herein. At the start of the MIMO operation control process 38, the programmable control function 32 receives signals to be transmitted over a plurality of endpoints (block 40). In response, the programmable control function 32 determines whether a MIMO channel associated with the plurality of endpoints is a tri-diagonal MIMO channel (block 42). If the MIMO channel associated with the plurality of endpoints is a tri-diagonal MIMO channel, the programmable control function 32 selects the simplified MIMO function 36 (block 44). Otherwise, the programmable control function 32 selects the default MIMO function 34 (block 46). After making the selection, the programmable control function 32 sends the signals to the selected MIMO function (block 48). The simplified MIMO communication scheme associated with the simplified MIMO function 36 is implemented by a MIMO-based electrical signal source that is discussed next.

Figure 6:
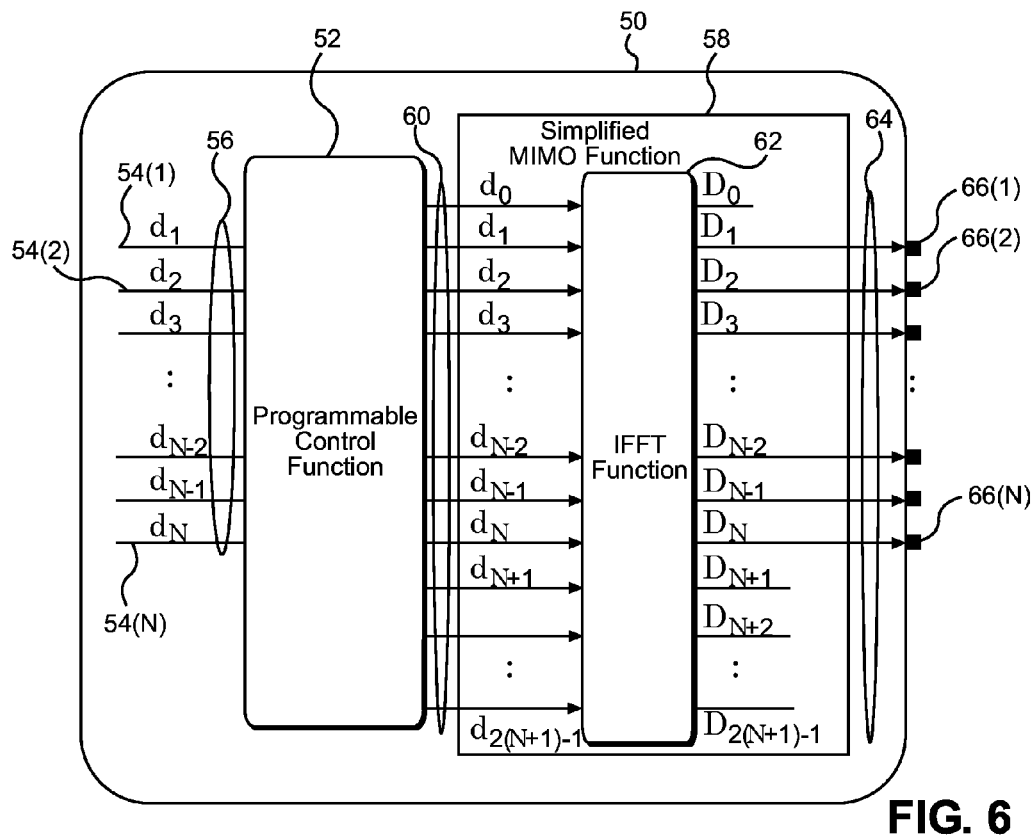
FIG. 6 is a block diagram of an exemplary MIMO-based electrical signal source that implements a simplified MIMO communication scheme according to exemplary aspects of the present disclosure.

In this regard, FIG. 6 is a block diagram of an exemplary MIMO-based electrical signal source 50 that implements the simplified MIMO communication scheme according to exemplary aspects of the present disclosure. The electrical signal source 50 comprises a programmable control function 52. The programmable control function 52 receives a plurality of communication signals 54(1)-54(N) over a first communication interface 56. The plurality of communication signals 54(1)-54(N) is associated with a first column vector $\{d_1, d_2, \ldots d_N\}$, wherein each element represents one of the plurality of communication signals 54(1)-54(N). For example, element $d_1$ represents communication signal 54(1), element $d_2$ represents communication signal 54(2), and so on such that element $d_N$ represents communication signal 54(N). In this regard, the first column vector contains N elements corresponding to the N communication signals 54(1)-54(N), respectively. The programmable control function 52 in turn generates a second column vector $\{d_0, d_1, d_2, \ldots d_N, d_{N+1}, d_{N+2}, \ldots d_{2(N+1)-1}\}$ that contains 2(N+1) elements. The second column vector contains all the elements of the first column vector $\{d_1, d_2, \ldots d_N\}$. In addition, the second column vector includes N+2 add-on elements denoted by $d_0, d_{N+1}, d_{N+2}, \ldots d_{2(N+1)-1}$, respectively. All of the N+2 add-on elements $d_0, d_{N+1}, d_{N+2}, \ldots d_{2(N+1)-1}$ have zero values. In other words, none of the N+2 add-on elements is associated with a real communication signal. The programmable control function 52 provides the second column vector $\{d_0, d_1, d_2, \ldots d_N, d_{N+1}, d_{N+2}, \ldots d_{2(N+1)-1}\}$ to a simplified MIMO function 58 over a second communication interface 60. An IFFT function 62, which works with the simplified MIMO function 58 and transforms the second column vector into a plurality of transformed signals (not shown) associated with a third column vector $\{D_0, D_1, D_2, \ldots D_N, D_{N+1}, D_{N+2}, \ldots D_{2(N+1)-1}\}$. A subset of transformed signals $D_1, D_2, \ldots D_N$ from among the plurality of transformed signals in the third column vector is of particular interest because they are the transformed counterparts of the plurality of communication signals 54(1)-54(N) associated with the first column vector $\{d_1, d_2, \ldots d_N\}$. For example, $D_1$ is a transformed signal of $d_1$, $D_2$ is a transformed signal of $d_2$, and so on, such that $D_N$ is a transformed signal of $d_N$. Subsequently, the simplified MIMO function 58 provides the subset of transformed signals $D_1, D_2, \ldots D_N$ over a third communication interface 64 to a plurality of communication endpoints 66(1)-66(N) for transmission. In a non-limiting example, the plurality of communication endpoints 66(1)-66(N) is equivalent to the plurality of endpoints 20'(1)-20'(N) in FIG. 3A. Although the programmable control function 52, the simplified MIMO function 58, and the IFFT function 62 are shown as separate elements in FIG. 6, there is nothing that prevents them from being integrated into a single element that is based on a software function, a hardware element, or a combination of both.

Figure 7:
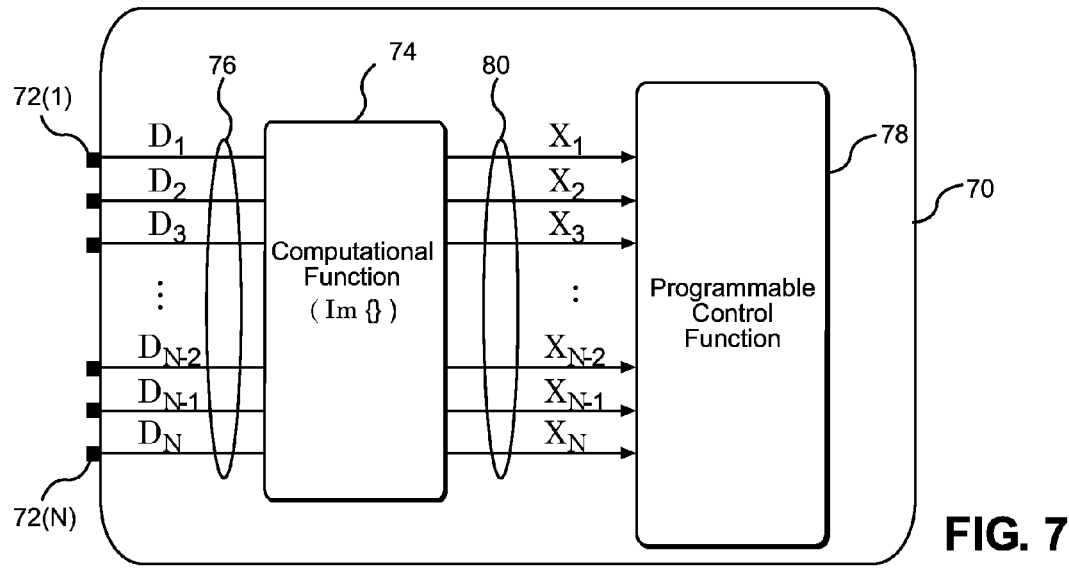
FIG. 7 is a block diagram of an exemplary electrical signal receiver that implements the simplified MIMO communication scheme of FIG. 6 according to exemplary aspects of the present disclosure.

With continuing reference to FIG. 6, the subset of transformed signals D1, D2, . . . DN is transmitted from the plurality of communication endpoints 66(1)-66(N) over the tri-diagonal MIMO channel (not shown) and received by an electrical signal receiver (not shown) also associated with the tri-diagonal MIMO channel (not shown). In this regard, FIG. 7 is a block diagram of an exemplary electrical signal receiver 70 that implements the simplified MIMO communication scheme of FIG. 6 according to exemplary aspects of the present disclosure. Elements of FIG. 6 are referenced in connection to FIG. 7 and will not be re-described herein. The electrical signal receiver 70 comprises a plurality of receiver communication endpoints 72(1)-72(N) that are communicatively coupled to the plurality of communication endpoints 66(1)-66(N) over the tri-diagonal MIMO channel (not shown). In a non-limiting example, the plurality of receiver communication endpoints 72(1)-72(N) is equivalent to the plurality of endpoints 22'(1)-22'(N) in FIG. 3A. The subset of transformed signals D1, D2, . . . DN is received by the plurality of receiver communication endpoints 72(1)-72(N) over the tri-diagonal MIMO channel (not shown) and provided to a computational function 74 in the electrical signal receiver 70 over a signal input interface 76. In a non-limiting example, the computational function 74 may be implemented as a software function, a hardware element, or a combination of both. Due to transformations performed by the IFFT function 62 in the electrical signal source 50, each of the subset of transformed signals D1, D2, DN is a complex conjugation comprising a real part and an imaginary part. The computational function 74 takes the imaginary part of the subset of transformed signals D1, D2, DN and generates a plurality of received signals X1, X2, . . . XN associated with a fourth column vector $\{X1, X2, \ldots XN\}$. The fourth column vector $\{X1, X2, \ldots XN\}$ is provided to a receiver programmable control function 78 over a signal output interface 80. The programmable control function 78, according to a non-limiting example, may be implemented as a software-based function, a hardware-based element, or a combination of both. Although the computational function 74 and the receiver programmable control function 78 are shown as separate elements in FIG. 7, there is nothing that prevents them from being integrated into a single element that is based on a software function, a hardware element, or a combination of both.

To ascertain the received signals $X_1, X_2, \ldots X_N$ produced by the computational function 74, evaluations of a unitary transformation are provided next. When the IFFT function 62 is not applied in the electrical signal source 50, the unitary transformation is a matrix multiplication that may be expressed as the following equation (Eq. 1):

$$x = Hd$$

wherein:

d is a N×1 column vector $\{d_1, d_2, \ldots d_N\}$ representing N transmitted signals (e.g., the first column vector in FIG. 6);

x is a N×1 column vector $\{X_1, X_2, \ldots X_N\}$ representing N received signals (e.g., the fourth column vector in FIG. 7); and H is a N×N unitary matrix with the property $UU^* = U^*U = I$, wherein I is an N×N identity matrix that has a value one (1) on the main diagonal and a value zero (0) elsewhere in the matrix.

For the N×N unitary matrix H of the following form, $$H: \begin{bmatrix} \sin\left(\frac{\pi}{N+1}\right) & \sin\left(\frac{2\pi}{N+1}\right) & \sin\left(\frac{3\pi}{N+1}\right) & \sin\left(\frac{4\pi}{N+1}\right) & \cdots & \sin\left(\frac{(N-1)\pi}{N+1}\right) & \sin\left(\frac{N\pi}{N+1}\right) \\ \sin\left(\frac{1 \cdot 2\pi}{N+1}\right) & \sin\left(\frac{2 \cdot 2\pi}{N+1}\right) & \sin\left(\frac{3 \cdot 2\pi}{N+1}\right) & \sin\left(\frac{4 \cdot 2\pi}{N+1}\right) & \cdots & \sin\left(\frac{(N-1) \cdot 2\pi}{N+1}\right) & \sin\left(\frac{N \cdot 2\pi}{N+1}\right) \\ \sin\left(\frac{1 \cdot 3\pi}{N+1}\right) & \sin\left(\frac{2 \cdot 3\pi}{N+1}\right) & \sin\left(\frac{3 \cdot 3\pi}{N+1}\right) & \sin\left(\frac{4 \cdot 3\pi}{N+1}\right) & \cdots & \sin\left(\frac{(N-1) \cdot 3\pi}{N+1}\right) & \sin\left(\frac{N \cdot 3\pi}{N+1}\right) \\ \vdots & \vdots & \vdots & \vdots & \ddots & \vdots & \vdots \\ \sin\left(\frac{1 \cdot (N-2)\pi}{N+1}\right) & \sin\left(\frac{2 \cdot (N-2)\pi}{N+1}\right) & \sin\left(\frac{3 \cdot (N-2)\pi}{N+1}\right) & \cdots & \sin\left(\frac{(N-2)(N-2)\pi}{N+1}\right) & \sin\left(\frac{(N-1)(N-2)\pi}{N+1}\right) & \sin\left(\frac{N(N-2)\pi}{N+1}\right) \\ \sin\left(\frac{1 \cdot (N-1)\pi}{N+1}\right) & \sin\left(\frac{2 \cdot (N-1)\pi}{N+1}\right) & \sin\left(\frac{3 \cdot (N-1)\pi}{N+1}\right) & \cdots & \sin\left(\frac{(N-2)(N-1)\pi}{N+1}\right) & \sin\left(\frac{(N-1)(N-1)\pi}{N+1}\right) & \sin\left(\frac{N(N-1)\pi}{N+1}\right) \\ \sin\left(\frac{1 \cdot N\pi}{N+1}\right) & \sin\left(\frac{2 \cdot N\pi}{N+1}\right) & \sin\left(\frac{3 \cdot N\pi}{N+1}\right) & \cdots & \sin\left(\frac{(N-2)N\pi}{N+1}\right) & \sin\left(\frac{(N-1)N\pi}{N+1}\right) & \sin\left(\frac{N \cdot N\pi}{N+1}\right) \end{bmatrix}$$

matrix multiplication according to Eq. 1 produces an x column vector $\{X_1, X_2, \ldots X_N\}$ that can be expressed by the following equations (Eq. 2):

$$X_1 = d_1 \sin\left(\frac{\pi}{N+1}\right) + d_2 \sin\left(\frac{2\pi}{N+1}\right) + d_3 \sin\left(\frac{3\pi}{N+1}\right) + \ldots +$$

$$d_{N-1} \sin\left(\frac{(N-1)\pi}{N+1}\right) + d_N \sin\left(\frac{N\pi}{N+1}\right) = \sum_{n=1}^{N} d_n \sin\left(\frac{\pi \cdot n}{N+1}\right)$$

$$X_2 = d_1 \sin\left(\frac{2\pi}{N+1}\right) + d_2 \sin\left(\frac{2 \cdot 2\pi}{N+1}\right) + d_3 \sin\left(\frac{3 \cdot 2\pi}{N+1}\right) + \ldots +$$

$$d_{N-1} \sin\left(\frac{(N-1) \cdot 2\pi}{N+1}\right) + d_N \sin\left(\frac{N \cdot 2\pi}{N+1}\right) = \sum_{n=1}^{N} d_n \sin\left(\frac{2\pi \cdot n}{N+1}\right)$$

$$\vdots$$

$$X_{N-1} = d_1 \sin\left(\frac{1 \cdot (N-1)\pi}{N+1}\right) + d_2 \sin\left(\frac{2 \cdot (N-1)\pi}{N+1}\right) +$$

$$d_3 \sin\left(\frac{3 \cdot (N-1)\pi}{N+1}\right) + \ldots d_N \sin\left(\frac{N \cdot (N-1)\pi}{N+1}\right) =$$

$$\sum_{n=1}^{N} d_n \sin\left(\frac{(N-1)\pi \cdot n}{N+1}\right)$$

$$X_N = d_1 \sin\left(\frac{1 \cdot N\pi}{N+1}\right) + d_2 \sin\left(\frac{2 \cdot N\pi}{N+1}\right) + d_3 \sin\left(\frac{3 \cdot N\pi}{N+1}\right) + \ldots +$$

$$d_{N-1} \sin\left(\frac{(N-1)N\pi}{N+1}\right) + d_N \sin\left(\frac{N^2\pi}{N+1}\right) = \sum_{n=1}^{N} d_n \sin\left(\frac{N\pi \cdot n}{N+1}\right)$$

As previously described in reference to FIG. 6, an IFFT performed by the IFFT function 62 on the second column vector $\{d_0, d_1, d_2, \ldots d_N, d_{N+1}, d_{N+2}, \ldots d_{2(N+1)-1}\}$ generates the plurality of transformed signals represented by the third column vector $\{D_0, D_1, D_2, \ldots D_N, D_{N+1}, D_{N+2}, \ldots, D_{2(N+1)-1}\}$. The subset of transformed signals $D_1, D_2, \ldots D_N$, which is actually transmitted by the plurality of communication endpoints 66(1)-66(N), may be expressed by the following equations (Eq. 3):

$$D_1 = \sum_{n=1}^{n=N} d_n \exp\left(\frac{j2\pi \cdot n}{K}\right) = \sum_{n=1}^{n=N} d_n \exp\left(\frac{j2\pi \cdot n}{2(N+1)}\right) = \sum_{n=1}^{n=N} d_n \exp\left(\frac{j\pi \cdot n}{(N+1)}\right)$$

$$D_2 = \sum_{n=1}^{n=N} d_n \exp\left(\frac{j2\pi \cdot 2 \cdot n}{K}\right) = \sum_{n=1}^{n=N} d_n \exp\left(\frac{j2\pi \cdot 2 \cdot n}{2(N+1)}\right) = \sum_{n=1}^{n=N} d_n \exp\left(\frac{j\pi \cdot 2 \cdot n}{(N+1)}\right)$$

$$D_3 = \sum_{n=1}^{n=N} d_n \exp\left(\frac{j2\pi \cdot 3 \cdot n}{K}\right) = \sum_{n=1}^{n=N} d_n \exp\left(\frac{j2\pi \cdot 3 \cdot n}{2(N+1)}\right) = \sum_{n=1}^{n=N} d_n \exp\left(\frac{j\pi \cdot 3 \cdot n}{(N+1)}\right)$$

$$\vdots$$

$$D_N = \sum_{n=1}^{n=N} d_n \exp\left(\frac{j2\pi \cdot N \cdot n}{K}\right) = \sum_{n=1}^{n=N} d_n \exp\left(\frac{j2\pi \cdot N \cdot n}{2(N+1)}\right) = \sum_{n=1}^{n=N} d_n \exp\left(\frac{j\pi \cdot N \cdot n}{(N+1)}\right)$$

Further, as described in reference to FIG. 7, the computational function 74 takes the imaginary part of the subset of transformed signals $D_1, D_2, \ldots D_N$ and generates the plurality of received signals associated with the fourth column vector $\{X_1, X_2, \ldots X_N\}$. Elements of the fourth column vector are expressed by the following equations (Eq. 4):

$$\text{Im}\{D_1\} = \sum_{n=1}^{n=N} d_n \sin\left(\frac{j\pi \cdot n}{(N+1)}\right) = X_1$$

$$\text{Im}\{D_2\} = \sum_{n=1}^{n=N} d_n \sin\left(\frac{j\pi \cdot 2 \cdot n}{(N+1)}\right) = X_2$$

$$\text{Im}\{D_3\} = \sum_{n=1}^{n=N} d_n \sin\left(\frac{j\pi \cdot 3 \cdot n}{(N+1)}\right) = X_3$$

$$\vdots$$

$$\text{Im}\{D_N\} = \sum_{n=1}^{n=N} d_n \sin\left(\frac{j\pi \cdot N \cdot n}{(N+1)}\right) = X_N$$

Not coincidentally, the x column vector produced by matrix multiplication as in Eq. 2 is identical to the fourth column vector produced by IFFT unitary transformations as in Eq. 3 and Eq. 4, thus, validating the simplified MIMO communication scheme according to exemplary aspects of the present disclosure.

Figure 8:
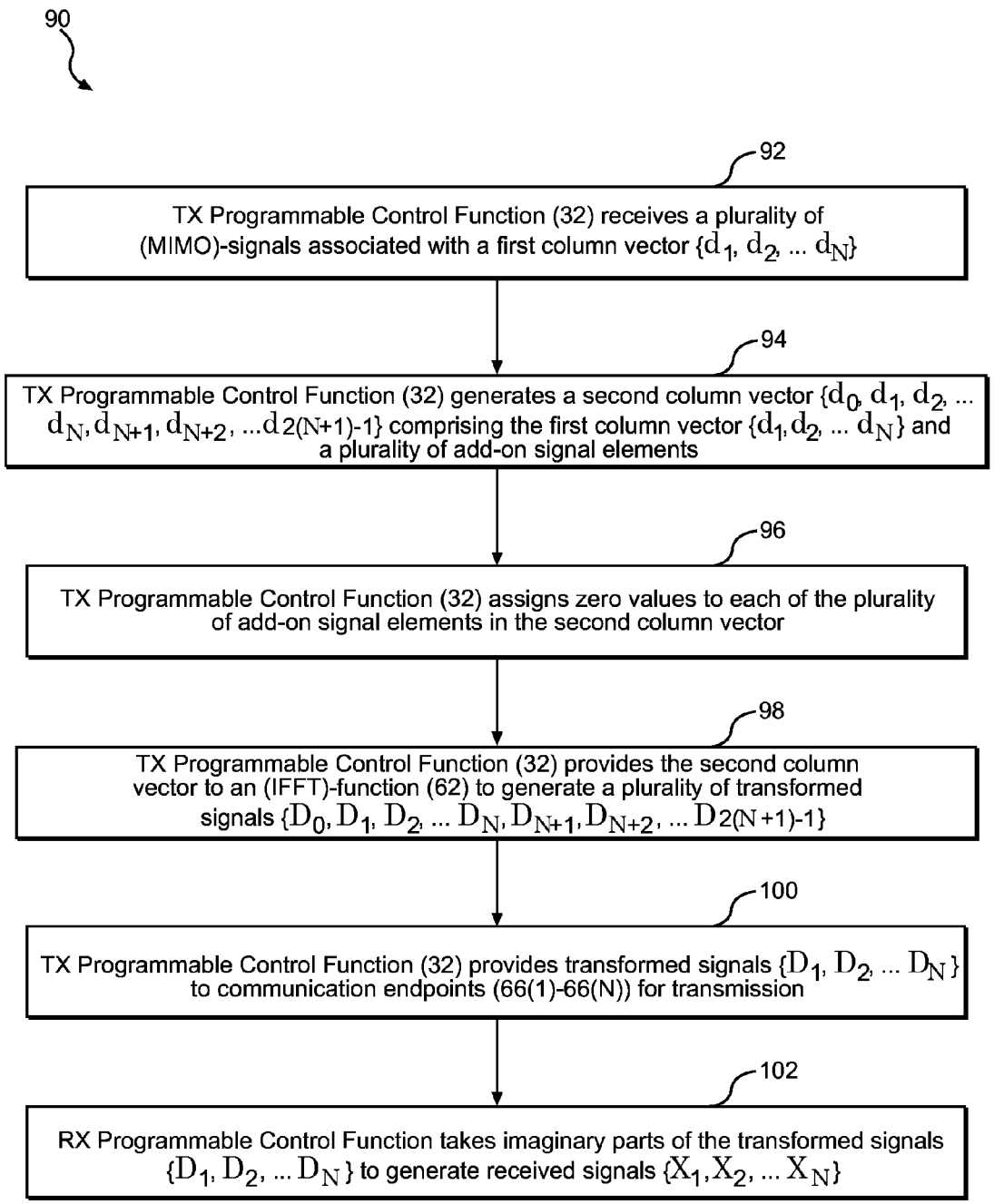
FIG. 8 is a flowchart of an exemplary interchip and intrachip communication process for implementing the simplified MIMO communication schemes of FIGS. 6 and 7.

In this regard, FIG. 8 is a flowchart of an exemplary interchip and intrachip communication process 90 for implementing the simplified MIMO communication schemes in FIGS. 6 and 7. Elements of FIG. 4 are referenced in connection to FIG. 8 and will not be re-described herein. According to the interchip and intrachip communication process 90, a transmitter (TX) programmable control function 32 first receives a plurality of MIMO communication signals associated with a first column vector $\{d_1, d_2, \ldots d_N\}$ (block 92). The TX programmable control function 32 then generates a second column vector $\{d_0, d_1, d_2, \ldots d_N, d_{N+1}, d_{N+2}, \ldots d_{2(N+1)-1}\}$ that comprises the first column vector $\{d_1, d_2, \ldots d_N\}$ and a plurality of add-on signal elements (block 94). The TX programmable control function 32 then assigns zero values to each of the plurality of add-on signal elements in the second column vector (block 96). As a result, the second column vector has a first element $d_0$ as zero (0) value, followed by elements $d_1, d_2, \ldots d_N$ from the first column vector, and followed by remaining elements $d_{N+1}, d_{N+2}, \ldots d_{2(N+1)-1}$ all having zero (0) values. Next, the TX programmable control function 32 provides the second column vector to an IFFT function 62 to generate a plurality of transformed signals $\{D_0, D_1, D_2, \ldots D_N, D_{N+1}, D_{N+2}, \ldots D_{2(N+1)-1}\}$ (block 98). Then, the TX programmable control function 32 provides the transformed signals $\{D_1, D_2, \ldots D_N\}$ to communication endpoints 66(1)-66(N) for transmission (block 100). The remaining transformed signals $D_0, D_{N+1}, D_{N+2}, \ldots D_{2(N+1)-1}$ are discarded. Upon receiving the transformed signals $\{D_1, D_2, \ldots D_N\}$, a receiver (RX) programmable control function takes imaginary parts of the transformed signals $\{D_1, D_2, \ldots D_N\}$ to generate the received signals $\{X_1, X_2, \ldots X_N\}$ (block 102).

Simplified MIMO communication schemes for interchip and intrachip communications according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
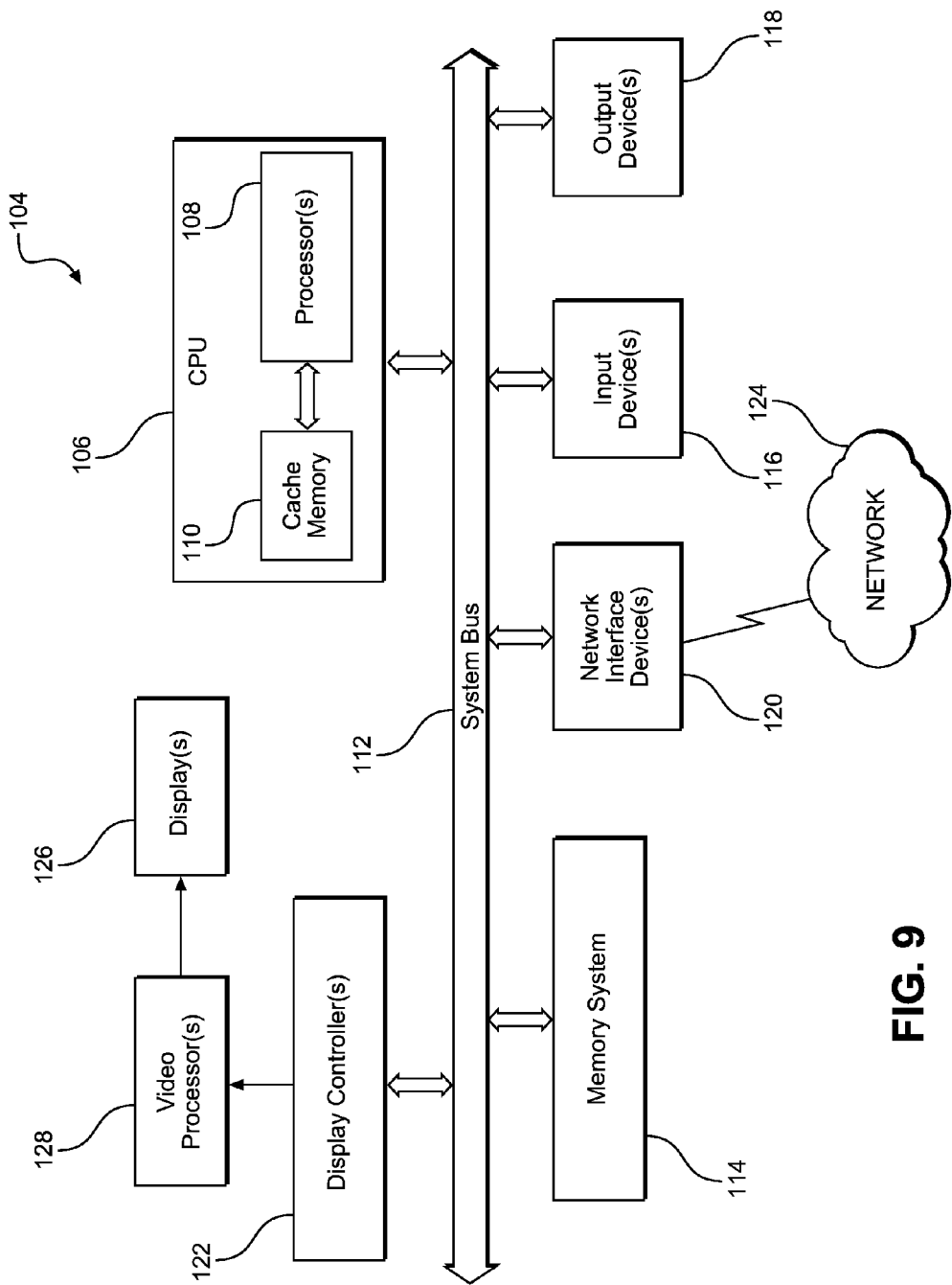
FIG. 9 is a block diagram of an exemplary processor-based system that can include the exemplary MIMO-based electrical signal source of FIG. 4.

In this regard, FIG. 9 illustrates an example of a processor-based system 104 that can employ the simplified MIMO communication scheme illustrated in FIGS. 4-8. In this example, the processor-based system 104 includes one or more central processing units (CPUs) 106, each including one or more processors 108. The CPU(s) 106 may have cache memory 110 coupled to the processor(s) 108 for rapid access to temporarily stored data. The CPU(s) 106 is coupled to a system bus 112 and can intercouple devices included in the processor-based system 104. As is well known, the CPU(s) 106 communicates with these other devices by exchanging address, control, and data information over the system bus 112. Although not illustrated in FIG. 9, multiple system buses 112 could be provided, wherein each system bus 112 constitutes a different fabric.

Other devices can be connected to the system bus 112. As illustrated in FIG. 9, these devices can include a memory system 114, one or more input devices 116, one or more output devices 118, one or more network interface devices 120, and one or more display controllers 122, as examples. The input device(s) 116 can include any type of input device, including but not limited to input keys, switches, voice processors, etc. The output device(s) 118 can include any type of output device, including but not limited to audio, video, other visual indicators, etc. The network interface device(s) 120 can be any devices configured to allow exchange of data to and from a network 124. The network 124 can be any type of network, including but not limited to a wired or wireless network, a private or public network, a local area network (LAN), a wireless local area network (WLAN), a wireless wide area network (WWAN), and the Internet. The network interface device(s) 120 can be configured to support any type of communications protocol desired. The memory system 114 can include one or more memory units (not shown).

The CPU(s) 106 may also be configured to access the display controller(s) 122 over the system bus 112 to control information sent to one or more displays 126. The display controller(s) 122 sends information to the display(s) 126 to be displayed via one or more video processors 128, which process the information to be displayed into a format suitable for the display(s) 126. The display(s) 126 can include any type of display, including but not limited to a cathode ray tube (CRT), a LED display, a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electrical signal source, comprising:
   a plurality of communication endpoints configured to transmit communication signals over a multiple input multiple output (MIMO) channel;
   a programmable control function communicatively coupled to the plurality of communication endpoints, the programmable control function configured to receive a plurality of MIMO communication signals associated with a first column vector; and wherein the programmable control function is further configured to:
  determine if the MIMO channel is a tri-diagonal MIMO channel;
  generate a second column vector comprising:
    the first column vector; and
    a plurality of add-on signal elements;
  provide the second column vector to an Inverse Fast Fourier Transformation (IFFT) function to generate a plurality of transformed signals; and
  cause a subset of the plurality of transformed signals to be transmitted over the plurality of communication endpoints.

2. The electrical signal source of claim 1, wherein the first column vector is $\{d_1, d_2, \ldots d_N\}$.

3. The electrical signal source of claim 2, wherein the plurality of add-on signal elements are denoted by $d_0, d_{N+1}, d_{N+2}, \ldots d_{2(N+1)-1}$, each of the plurality of add-on signal elements is set to zero (0).

4. The electrical signal source of claim 3, wherein the second column vector is $\{d_0, d_1, d_2, \ldots d_N, d_{N+1}, d_{N+2}, \ldots d_{2(N+1)-1}\}$.

5. The electrical signal source of claim 4, wherein the plurality of transformed signals is associated with a third column vector $\{D_0, D_1, D_2, \ldots D_N, D_{N+1}, D_{N+2}, \ldots D_{2(N+1)-1}\}$.

6. The electrical signal source of claim 5, wherein the subset of the plurality of transformed signals to be transmitted over the plurality of communication endpoints is associated with elements $D_1, D_2, \ldots D_N$ from the third column vector.

7. The electrical signal source of claim 1, wherein the programmable control function is further configured to invoke a default MIMO communication method if the MIMO channel is determined to be a non-tri-diagonal MIMO channel.

8. The electrical signal source of claim 1 integrated into an integrated circuit (IC).

9. The electrical signal source of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

10. An electrical signal source means, comprising:
  a means for communication signal transmission over a multiple input multiple output (MIMO) channel having a tri-diagonal channel response matrix;
  a means for programmable control communicatively coupled to a plurality of communication endpoints, the means for programmable control configured to receive a plurality of MIMO communication signals associated with a first column vector; and
  wherein the means for programmable control is further configured to:
    generate a second column vector comprising:
      the first column vector; and
      a plurality of add-on signal elements;
    provide the second column vector to an Inverse Fast Fourier Transformation (IFFT) function to generate a plurality of transformed signals; and
    cause a subset of the plurality of transformed signals to be transmitted over the plurality of communication endpoints.

11. A method for transmitting communication signals over a multiple input multiple output (MIMO) channel having a tri-diagonal channel response matrix, comprising:
  receiving a plurality of MIMO communication signals associated with a first column vector $\{d_1, d_2, \ldots d_N\}$;
  generating a second column vector $\{d_0, d_1, d_2, \ldots d_N, d_{N+1}, d_{N+2}, \ldots d_{2(N+1)-1}\}$, the second column vector comprising the first column vector $\{d_1, d_2, \ldots d_N\}$ and a plurality of add-on signal elements;
  providing the second column vector to an Inverse Fast Fourier Transformation (IFFT) function to generate a plurality of transformed signals associated with a third column vector $\{D_0, D_1, D_2, \ldots D_N, D_{N+1}, D_{N+2}, \ldots D_{2(N+1)-1}\}$; and
  providing a subset of transformed signals $\{D_1, D_2, \ldots D_N\}$ from the third column vector to a plurality of communication endpoints for transmission.

12. The method of claim 11, further comprising assigning zero (0) value to each of the plurality of add-on signal elements.

13. The method of claim 11, further comprising generating received signals associated with a fourth column vector $\{X_1, X_2, \ldots X_N\}$ by taking imaginary parts of the subset of transformed signals $\{D_1, D_2, \ldots D_N\}$.

14. A multiple input multiple output (MIMO) communication system for communication, comprising:
  an electrical signal source, comprising:
    a programmable control function communicatively coupled to a first communication interface and a second communication interface;
    a simplified MIMO function communicatively coupled to the second communication interface and a third communication interface, the simplified MIMO function comprising an Inverse Fast Fourier Transformation (IFFT) function; and
    a plurality of communication endpoints communicatively coupled to the third communication interface;
  an electrical signal receiver, comprising:
    a plurality of receiver communication endpoints communicatively coupled to a signal input interface;
    a computational function communicatively coupled to the signal input interface and a signal output interface; and
    a receiver programmable control function communicatively coupled to the signal output interface; and
  a MIMO channel coupled with the plurality of communication endpoints and the plurality of receiver communication endpoints, wherein the MIMO channel is a tri-diagonal MIMO channel.

15. The MIMO communication system of claim 14, wherein the programmable control function is a software-based function.

16. The MIMO communication system of claim 14, wherein the programmable control function is a hardware-based element.

17. The MIMO communication system of claim 14, wherein the simplified MIMO function is a software-based function.

18. The MIMO communication system of claim 14, wherein the simplified MIMO function is a hardware-based element.

19. The MIMO communication system of claim 14, wherein the simplified MIMO function is integrated with the programmable control function.

20. The MIMO communication system of claim 14, wherein the receiver programmable control function is a software-based function.

21. The MIMO communication system of claim 14, wherein the receiver programmable control function is a hardware-based element.

22. The MIMO communication system of claim 14, wherein the computational function is configured to:
   receive a plurality of MIMO communication signals on the signal input interface;
   extract an imaginary part of the plurality of MIMO communication signals; and
   provide the imaginary part of the plurality of MIMO communication signals to the signal output interface.

23. The MIMO communication system of claim 14, wherein the computational function is a software-based function.

24. The MIMO communication system of claim 14, wherein the computational function is a hardware-based element.

25. The MIMO communication system of claim 14, wherein the computational function is integrated with the receiver programmable control function.

\* \* \* \* \*